Oct. 22, 1968   R. SCHÖFFL   3,406,606
DEVICE FOR THE TRANSPORT AND LAUNCHING OF ROCKET
PROJECTILES HAVING A RIGID TAIL ASSEMBLY
Filed July 11, 1966   4 Sheets-Sheet 1

INVENTOR
RAINER SCHÖFFL

BY Dicke & Craig
ATTORNEYS

Oct. 22, 1968  R. SCHÖFFL  3,406,606
DEVICE FOR THE TRANSPORT AND LAUNCHING OF ROCKET
PROJECTILES HAVING A RIGID TAIL ASSEMBLY
Filed July 11, 1966  4 Sheets-Sheet 2

INVENTOR
RAINER SCHÖFFL

BY *Dicke + Craig*
ATTORNEYS

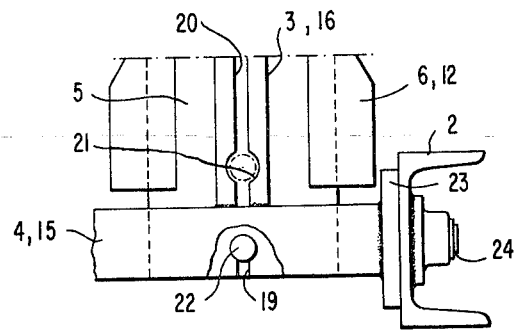
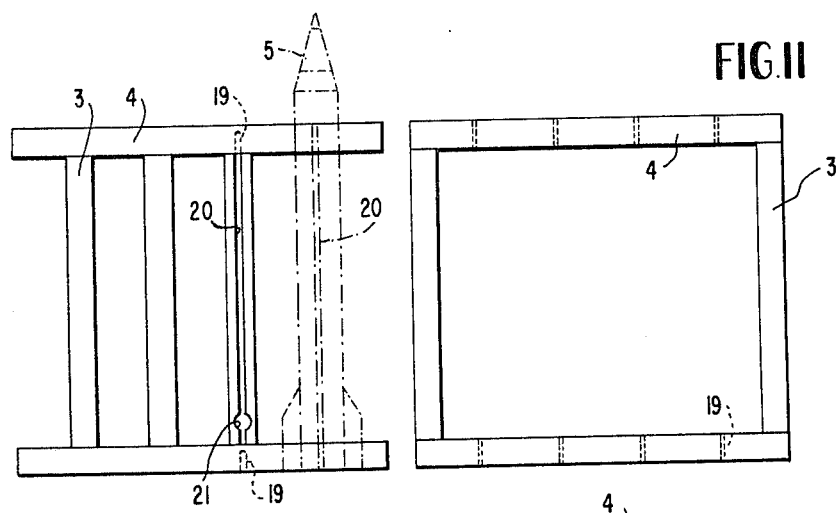
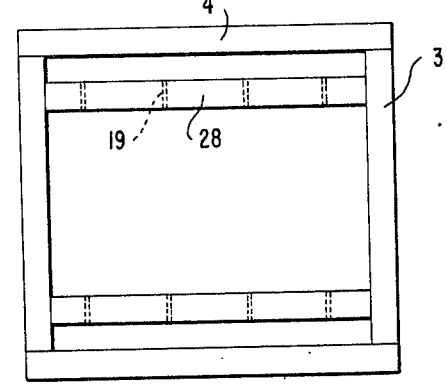

INVENTOR
RAINER SCHÖFFL

BY *Dicke + Craig*
ATTORNEYS

United States Patent Office 3,406,606
Patented Oct. 22, 1968

3,406,606
DEVICE FOR THE TRANSPORT AND LAUNCHING OF ROCKET PROJECTILES HAVING A RIGID TAIL ASSEMBLY
Rainer Schöffl, Liebenau, Germany, assignor to Dynamit Nobel Aktiengesellschaft, Troisdorf, Postfach, Germany
Filed July 11, 1966, Ser. No. 564,417
Claims priority, application Germany, July 15, 1965, D 47,732
20 Claims. (Cl. 89—1.815)

ABSTRACT OF THE DISCLOSURE

A frame that will hold rockets having rigid tail assemblies in a compact transport position where the rigid tail assemblies are transversely overlapping and is shiftable to a launching position where the rockets are held so that their rigid tail assemblies are transversely spaced from each other to allow clearance for independent firing of the rockets.

Background of the invention

The prior art launching devices for rockets having a rigid tail assembly are relatively large and bulky when viewed in a transverse cross-section, because the rigid fins of the tail assembly generally protrude beyond the calibre of the projectiles a considerable distance, for example, twice the diameter of the rocket body. Such a disadvantage is particularly evident in launching devices holding a plurality of superimposed layers of a plurality of rockets, which must be spaced from each other a minimum distance to allow clearance for the tail assembly fins. The disadvantage of the relatively large transverse cross-section can be overcome by holding the rockets in axially displaced positions relative to each other of at least one tail assembly length so that the rockets may be placed transversely as close to each other as the suspension and guide means will allow; although this will decrease the transverse cross-sectional area of the launcher, such an assembly produces a disadvantage that if one of the rockets fails to ignite during launching, there is a possibility that other rockets will be prevented from launching, because in the transverse cross-section, the tail assemblies of adjacent rockets will overlap each other. While there is a gain in compactness, there is an offsetting loss in safety and efficiency.

Summary of the invention

It is an object of the present invention to provide a relatively simple rocket launcher and transport device that will not have the disadvantages mentioned above in regard to the prior art devices. More particularly, it is an object of the present invention to provide a launching and transport device for rockets having rigid tail assemblies, where the device will be compact in the transverse cross-section and not have the disadvantages mentioned above in regard to safety and efficiency.

The device of the present invention for the transport and launching of rockets having rigid tail assemblies is particularly designed to hold a plurality of rockets in side by side relationship and superimposed in at least two layers. The device has a framework for receiving the rocket projectiles that is provided with a plurality of plane suspension frames corresponding to the number of layers of rockets, the frames having means at their underside for suspending the rockets and being pivotally connected at their front and rear of both longitudinal sides with struts pivotally connected to a base. These struts may be pivoted either forwardly or rearwardly from the launching position, where they are at right angles to the base, to the transport position. In the launching position, the rockets are spaced from each other so that the tail assemblies of the rockets will not intersect each other; thus, each rocket may be fired independently from and without impairing any other rockets. When the struts are pivoted to the transport position, the individual suspension frames will be displaced in the longitudinal direction relative to each other, while the distance between frames and the overall height of the device are simultaneously reduced; at all times, the frames remain parallel to each other. By correlating the distances that the suspension frames are pivotally connected to the struts, the length of each rocket tail assembly, the transverse dimensions of the rockets, and the transverse dimensions of the guide means or suspension means for the rockets, the relative longitudinal displacement of the individual rockets with respect to each other will be approximately the length of one tail assembly so that in the transport position the device will have the lowest possible transverse dimension and the rockets will be superimposed as closely as the suspension and guide means will allow, without impairing the tail assemblies.

It is contemplated that the suspension frames may be constructed in a variety of different ways. For example, they may be quadrangular frames, each having one front and one rear crossbar rigidly connected together by transversely spaced longitudinal bars. The rockets are suspended by the crossbars; additionally, longitudinally extending sliding guide slots may be provided on the underside of the longitudinal bars to provide a relatively short guide for the rockets within the framework of the launcher. A particularly desirable construction employs a longitudinal bar for each of the rockets in each of the layers with the longitudinal bars being rigidly connected to the front and rear crossbars of their respective layers. With the sliding guide slots of the longitudinal bars extending in the longitudinal direction, the rockets may be easily inserted into the framework from the rear and the rockets may be guided by the framework during firing. The framework may be constructed so that the rockets are suspended and prevented from falling out toward the front or rear by suitable construction of the crossbars and the longitudinal bars.

To assist in the pivoting of the struts, which may be heavily loaded with rockets, it is contemplated that a mechanical, hydraulic, pneumatic, or the like power device may be employed.

Brief description of the drawing

Further objects, features, and advantages of the present invention will appear from the following specification in connection with the description of the accompanying drawings, in which:

FIGURE 8 is a top plan view, with portions broken away, of the framework according to FIGURES 5 and 6;

FIGURES 10, 10a and 10b show three different pivoted positions of a framework having side and end sheathing, according to another embodiment of the present invention; and FIGURES 11, 12 and 13 are top schematic plan views of three embodiments of suspension frames according to the present invention.

*Detailed description of the drawing*

Figure 1A:
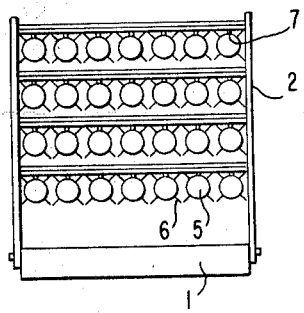
FIGURE 1a is a rear end view of the device of FIGURE 1.
Figure 1:
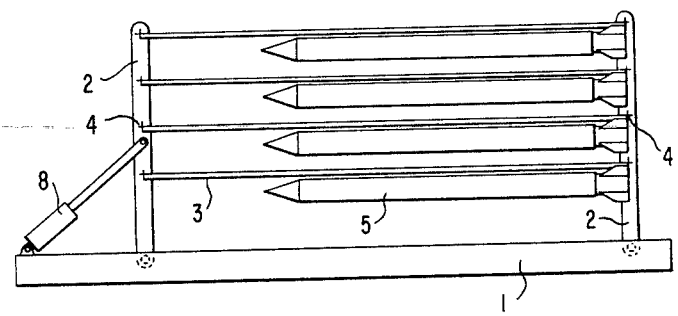
FIGURE 1 is a side elevation view of a device embodying the principles of the present invention, which is loaded with rockets and in the launching position.

In the embodiment according to FIGURE 1, the base 1 has a plurality of generally upwardly extending struts 2 pivotally mounted at their lower ends for pivotal movement in a generally longitudinal direction to the front or rear. A plurality of suspension frames comprising longitudinal bars 3 rigidly interconnecting cross-bars 4, for example, by welding, are pivotally connected to the struts 2. A plurality of rockets 5 having rigid tail assemblies 6 are suspended by glide shoes 7 to the underside of the suspension frames. The suspension frames are constructed and spaced from each other so that the rockets 5 can be independently fired without interfering with other rockets, in the launching position shown in FIGURE 1. It is seen from FIGURE 1a that the tail assemblies 6 are spaced from each other so that they will not interfere with each other during launching. Power means 8, for example, a hydraulic power cylinder, are pivotally connected at one end to the base 1 and pivotally connected at the other end to each of the front struts 2 (only one is shown in the drawing) to pivot the struts between the launching position and the transport position. The above described framework may be mounted on a suitable universally mounted table (not shown) so that the rockets may be fired in any direction at any angle.

Figure 2A:
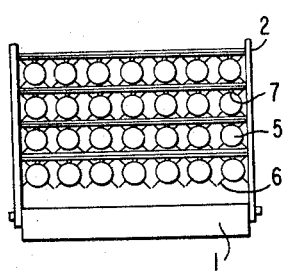
FIGURE 2a is a rear end view of FIGURE 2.
Figure 2:
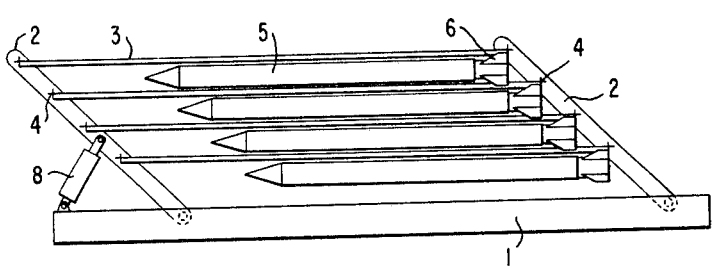
FIGURE 2 is a view similar to FIGURE 1, with the device in the transport position.

In FIGURE 2, the power means 8 has been retracted to forwardly pivot the struts 2 from the launching position of FIGURE 1 where the struts form a right angle with the base to the transport position of FIGURE 2 where the struts are forwardly inclined. From a comparison of FIGURES 1 and 2, it is seen that in the transport position the overall height of the framework and the spacing between superimposed suspension frames have been reduced to the lowest possible dimensions, the rockets 5 of successive layers have been axially or longitudinally displaced relative to each other by an amount approximately equal to the longitudinal length of the tail assemblies 6. In the position of FIGURE 2, the rockets cannot be independently fired, because the tail assemblies 6 of superimposed rockets overlap in the transverse direction; therefore, the rockets cannot be satisfactorily fired from the transport position. The framework must be pivoted from the transport position of FIGURE 2 to the launching position of FIGURE 1 prior to launching the rockets.

It it contemplated that the framework may be folded rearwardly from the position of FIGURE 1 to a transport position where the struts 2 are inclined rearwardly. In order to achieve the same space-saving arrangement, it is contemplated that the rear cross-bars of the suspension frames are constructed with a very small height or are provided with recesses within the areas adjacent to the rockets 5. With this arrangement, it will be most expedient to provide the power means 8 at the rear of the framework; also, it is contemplated that the power means may be pivotally connected between the base 1 and one of the longitudinal bars 3.

Figure 3:
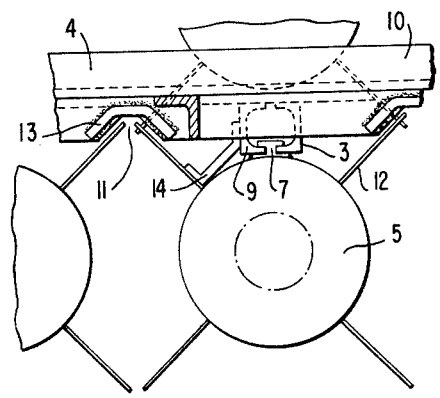
FIGURE 3 is an end view on an enlarged scale showing the rocket suspension, with portions broken away.
Figure 4:
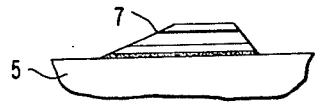
FIGURE 4 is a side elevation view of the guide shoe shown in FIGURE 3, with portions broken away.

In the embodiment of FIGURE 3, the longitudinal bars 3 are constructed of two U-shaped profile bars 9, which are mounted with their channels facing each other by attaching their upper legs at the front and rear to the cross-bars 4, for example by welding. The lower legs of the bars 9 are spaced from each other to form a slot for receiving the glide shoes 7, which are welded to the front and rear periphery of the rockets 5. Thus, the longitudinal bars 3 serve simultaneously as sliding glide bars for guiding the rockets during their launching and as rigid braces connecting the cross-bars 4 to form the suspension frames. The cross-bars 4 are formed of two identical angle bars 10 suitably secured together. The lowermost angle bar 10 of each cross-bar 4 is provided with a recess 11 suitably reinforced by a stiffening sheet 13 to receive and provide room for the fins 12 of the tail assemblies 6, which usually have twice the diameter of the rockets 5. If the rockets 5 are provided with rotation producing means, for example, with a ring of uniformly disposed skewed guide vanes projecting into the inside cross-section of the nozzle, bars 14 are provided to prevent an undesirable rotation or canting of the rockets within the framework. Also, these guide bars 14 will act to improve the guiding and prevent tilting of rockets without rotation producing means during their launching from the framework. In FIGURE 4, a glide shoe 7 is shown as being welded to the outer periphery of a rocket 5. It is contemplated that other means may be used to rigidly attach a glide shoe 7 to the rocket 5. The glide shoe 7 is sharply beveled at its front edge for favorable flight characteristics.

The embodiment of the present invention according to FIGURES 5, 5a, 6 and 6a is quite similar to the embodiment according to FIGURES 1, 1a, 2 and 2a; therefore, like reference numerals will be used to identify corresponding parts. The framework of the FIGURE 5 embodiment has a shorter overall length relative to the rocket projectiles, differently constructed suspension frame and larger spacing between superimposed suspension frames than the embodiment according to FIGURE 1. Details of the framework are shown in FIGURES 7, 8, 9a and 9b. The front and rear cross-bars 4 are constructed of two identical angle bars 15 suitably secured together, for example, by welding, to form a hollow rectangular bar. The longitudinal bars 3 have the exclusive function of suspending the rockets 5 and are constructed as flat bandlike bars 16. By comparing FIGURES 5a and 6a with FIGURES 1a and 2a, it is seen that this construction provides a much lower height in the transport position as compared to the height in the launching position.

Figure 5A:
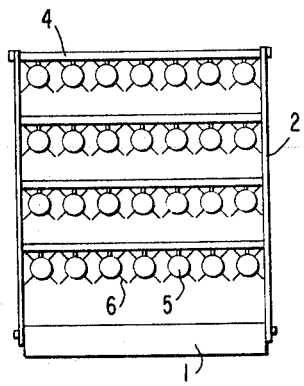
FIGURE 5a is an end view of the FIGURE 5 embodiment.
Figure 5:
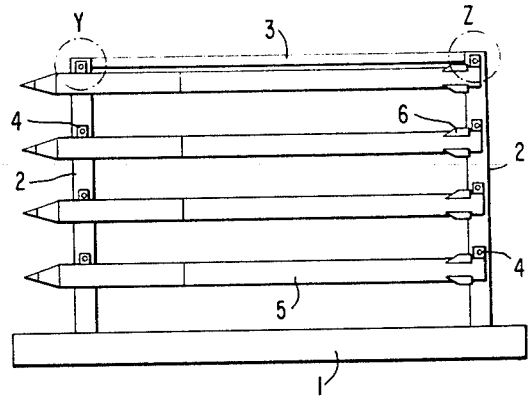
FIGURE 5 is a view similar to FIGURE 1, of another embodiment of the present invention shown in the launching position.
Figure 6A:
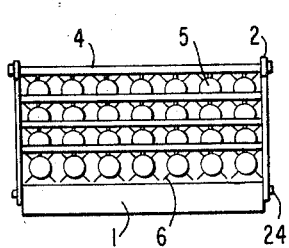
FIGURE 6a is an end view of the FIGURE 6 embodiment.
Figure 6:
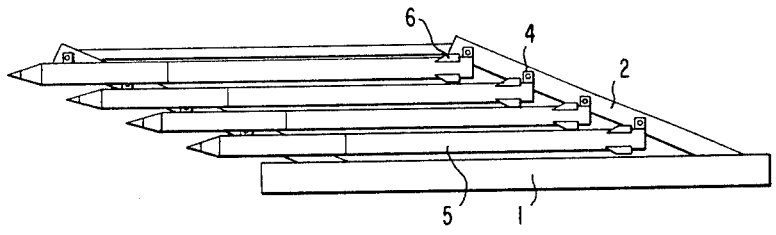
FIGURE 6 is a view similar to FIGURE 5, with the embodiment in the transport position.
Figure 7:
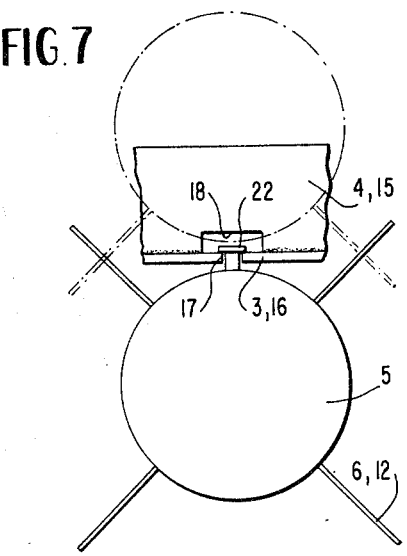
FIGURE 7 is a view similar to FIGURE 3, but of the FIGURE 5 embodiment in the transport position of FIGURE 6, with portions broken away.
Figure 9A:
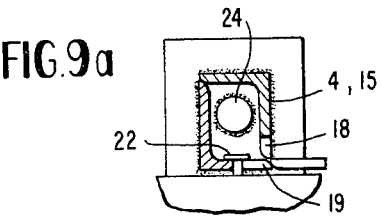
FIGURES 9a and 9b are cross-sectional views of the framework shown within the dotted line circles Y and Z, of FIGURE 5.
Figure 9B:
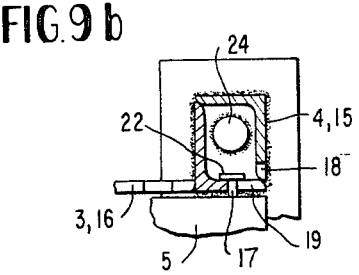

With rockets having a rigid tail assembly 6 double the diameter of the rocket body, the rockets 5 in the FIGURE 5 embodiment are suspended exclusively by the cross-bars 4, preferably by break-away pins 17 that are welded or otherwise secured to the rockets 5. As shown in FIGURES 7, 9a and 9b, the cross bars 4, 15 each have slots 19 for receiving the break-away pins 17 in abutting engagement with their forward slot bottoms so that the break-away pins cannot move in the forward longitudinal direction. As shown in FIGURE 8, the longitudinal bars 3 have a longitudinal slot 20 extending over their entire length and aligned with the slot 19. At the rear end of each longitudinal bar 3, the slot 20 widens into a circular shape 21 for the insertion of the head 22 of the forwardmost break-away pin 17 of the corresponding rocket; each rocket is provided with a plurality of break-away pins 17. As shown in FIG. 9a, the front end of the slot 20 passes over into and communicates with the slot 19 of the forward cross bar 4, so that the shank portion of the corresponding break-away pin 17 may travel uninterruptedly from the slot 20 to the slot 19. The rearward angle bar 15 of the forward cross-bar 4 is provided with a cut out portion 18 so that the head 22 of the break-away pin 17 may freely travel from the slot 20 to the slot 19. As shown in FIGURE 9b, the rearmost break-away pin 17 of the corresponding rocket 5 is inserted into the rearwardly opening slot 19 in the bottom flange of the forward angle bar 15 of the rear cross-bar 4; the rear angle bar 15 of the rear cross-bar 4 is provided with a cut-out portion 18 so that the head 22 may freely pass into the space within the rear cross-bar 4. Thus, it is seen that the rockets 5 may be easily loaded from the rear of the framework.

As shown in FIGURE 8, the cross bars 4 are provided with welded flanges 23 at each end. As shown in FIGS. 8, 9a and 9b, pivot shafts 24 are welded onto each of the flanges 23 to extend outwardly through the struts 2 to form pivotal bearings for the suspension frames.

As mentioned above, a comparison between FIGS. 5 and 2 shows that the spacing between the superimposed suspension frames is greater in the launching position for the embodiment according to FIGURE 5. This relatively large spacing is provided so that after the break-away pins 17 break-away from the rockets 5 and are left in the slots 19, the rockets 5 will freely fall and move forwardly during the launching acceleration. Although the FIGURE 5 embodiment has a greater spacing between superimposed suspension frames in the launching position, the FIGURE 5 embodiment has a lower height in the transport position than the FIGURE 1 embodiment, because of the absence of any stable gliding guide tracks formed in the longitudinal bars and cross-bars. This construction has the additional advantage that it is possible to impart rotation to the rocket while it is still in the launching framework.

Figure 10:
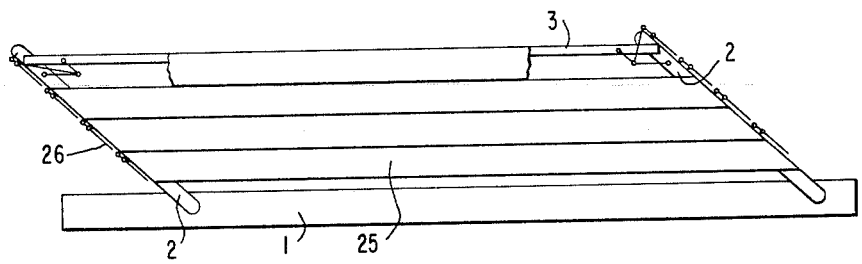
Figure 10:
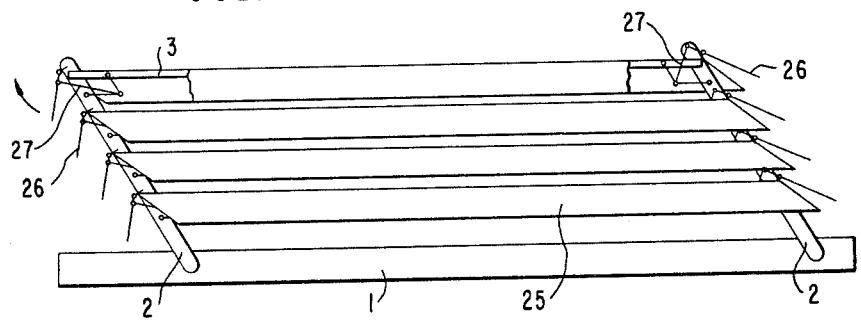
Figure 10:
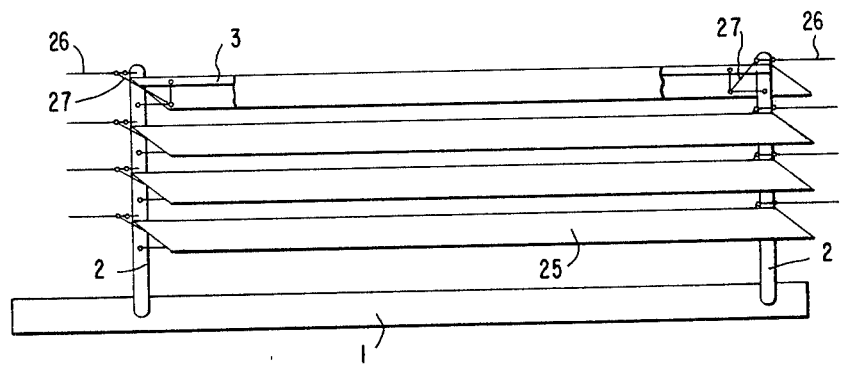

In the embodiment according to FIGURES 10, 10a and 10b, the framework is provided with front and side sheathing. The side sheathing is formed by a plurality of side sheets 25, which correspond to the number of and are connected to the suspension frames. In the transport position, the sheets 25 form a continuous parallelogram shaped surface. The front and rear of the framework is provided with a plurality of sheets 26, which form a continuous rectangularly shaped surface, when the framework is in the transport position. An elbow lever system 27 will hold the sheets 26 in alignment when the framework is in the transport position and will automatically pivot the sheets 26 about their hinged upper edge so that they will swing to an open position parallel to the suspension frames when the framework is moved to the launching position, so that the sheets 26 will not interfere with the firing of the rockets 5. It is contemplated that the sheathing shown in the FIGURES 10, 10a and 10b may be provided on any of the previously described embodiments, for example, the embodiments of FIGURES 1, 1a, 2, 2a, 5, 5a, 6, and 6a.

As shown in FIGURES 11 and 12, the cross-bars 4 are joined to the longitudinal bars 3 to form a rigid quadrangular frame by means of welding, bolting or the like. In FIGURE 11, the underside of the cross-bars 4 are provided with gliding guide slots 19 over their full width in the longitudinal direction of the suspension frame for suspending rockets and providing a short guiding track for the rockets during launching. In FIGURE 12, similar gliding guide slots 19 are disposed on the underside of additional cross-bars 28. If it is desired to suspend the rocket projectiles from the suspension frame by means of break-away pins, the slots 19 in FIGURES 11 and 12 may be closed at their forward ends.

In the embodiment according to FIGURE 13, the cross-bars 4 are rigidly joined to a plurality of longitudinal bars by welding, bolting, or the like to form a lattice-like rigid frame. The number of longitudinal bars 3 corresponds to the number of rockets to be held by the suspension frame. For purposes of illustration, only one of the longitudinal bars 3 is shown as having a gliding guide slot 20 on its underside, which is in communication with a corresponding slot 19 on the underside of the cross bars 4. On the far right hand side of FIGURE 13, a rocket 5 and its supporting slot 20 have been shown in dotted lines for purposes of illustration. If the frame of FIGURE 13 were used in a construction similar to that shown in FIGURE 3 where the longitudinal bar 3 projects downwardly beyond the cross bars 4, the slots 19 within the area of the cross bars 4 would be unnecessary. The construction of the longitudinal bars that is second from the right hand side in FIGURE 13 corresponds essentially to that of FIGURES 7, 8, 9a and 9b; the rocket 5 is readily suspended by insertion from the rear of the break-away pins into the slots 19 and 20, and the break-away pins are restrained by the forward closed end of the slots 19 during launching so that the break-away pins are torn from the rockets and remain within the slots 19 after the rocket has been launched. The suspension frames according to FIGURES 11, 12 and 13 may be employed in any of the embodiments previously described.

All of the embodiments and modifications that have been described above are for purposes of illustration; further modifications and embodiments are contemplated and will be possible within the spirit and scope of the invention as defined by the following claims.

I claim:

1. A device for the transport and launching of rockets having rigid tail assemblies, a plurality of which are disposed side by side, and are superimposed in at least two layers, comprising: a base; a plurality of struts pivotally connected to said base for pivotal motion in a generally longitudinal direction; framework means for receiving the rocket projectiles being provided with a plurality of plane suspension frames corresponding to the number of layers of rockets; said frames having, at the underside thereof, means for suspending the rocket projectiles; and said frames being pivotally connected at the front and rear of both longitudinal sides with said structs to extend substantially parallel with said base for movement between a collapsed transport position and an expanded launch position.

2. The device of claim 1 wherein each of said suspension frames has one front and one rear cross bar, and a plurality of longitudinal bars corresponding to the number of rockets of each layer, rigidly connecting said cross-bars with each other.

3. The device of claim 2, wherein each of said longitudinal bars is provided with a gliding guide slot extending in the longitudinal direction.

4. The device according to claim 1, including power means for pivoting said struts generally in the longitudinal direction.

5. The device according to claim 2, including power means for pivoting said struts generally in the longitudinal direction.

6. The device according to claim 3, including power means for pivoting said struts generally in the longitudinal direction.

7. The device according to claim 3, wherein each of said longitudinal bars comprise two substantially U-shaped profile bars rigidly connected at each end to said cross-bars with their channels facing each other and the lower legs of said U-shaped bars being spaced from each other to form said sliding guide slot.

8. The device according to claim 7, including a guide bar means rigidly attached to and depending from one of said U-shaped bars for engaging one of the rigid fins of the corresponding rocket tail assembly to prevent rotation of the rocket.

9. The device according to claim 2, wherein each of said cross-bars comprise two angle bars rigidly connected with each other and having the outside surfaces of adjacent flanges in abutment, the lowermost one of said angle bars having recesses formed in its depending flange to provide clearance for the rigid fins of the rocket tail assemblies, and a correspondingly shaped reinforcing plate means rigidly attached transverse to said depending flange for reinforcing the depending flange.

10. The device according to claim 7, including a rocket having a glide shoe rigidly attached to its outer periphery, said glide shoe having a T-shaped cross-section upper portion for engagement in said gliding guide slot, and said glide shoe being sharply beveled at its forward edge for improved flight characteristics.

11. The device according to claim 2 wherein each of said cross bars comprise two angle bars rigidly connected with respect to each other to form a hollow rectangular bar, the bottom flange of the lowermost of said angle bars having a slot-like recess opening rearwardly for the reception of a break-off pin mounted on the corresponding rocket.

12. The device according to claim 11, wherein each of said longitudinal bears comprises a flat strip having a longitudinally extending slot communicating with the corresponding slot-like recess in the forward cross-bar and having an area of increased width at its rearward end for the reception of an enlarged head of the corresponding rocket suspending member.

13. The device according to claim 11, including a generally longitudinally extending plate rigidly attached to each end of each of said cross-bars, a shaft rigidly mounted on the outside of each of said generally longitudinally extending plates, and said struts having bores for the pivotal reception of said shafts.

14. The device according to claim 1, wherein each of said suspension frames has a side sheet mounted on each side and extending its full longitudinal length, said side sheets forming a parallelopiped continuous sheathing surface on each side of said framework means in the transport position, said framework means having a plurality of front and rear sheets aligned with and extending the full width of each of said frames, said front and rear sheets being pivotally mounted about one of their elongated edges for movement between an aligned position where they form a continuous sheet in the transport position of said frame work means and a position where they extend substantially parallel to said suspension frames in the launching position of said framework means, and means to automatically pivot said front and rear sheets between said aligned and said parallel positions simultaneously with the movement of said framework means between said transport and said launching positions, respectively.

15. The device of claim 1, wherein each of said suspension frames consists essentially of one front and one rear cross-bar, and two side longitudinal bars rigidly connected to the opposite ends of said cross-bars; said cross-bars having longitudinally extending slot means for the reception of rocket suspension mountings.

16. The device according to claim 1, wherein each of said suspension frames consists essentially of one front and one rear cross-bar rigidly connected at their outer ends by side longitudinal bars, and an additional cross-bar inwardly spaced from each of said first mentioned cross bars and rigidly attached to said side longitudinal bars; each of said additional cross bars having slot means for the reception of rocket suspension mountings.

17. A device for the transport and launching of rockets having a rigid tail assembly, a plurality of which are disposed side by side and are superimposed in at least two layers, comprising: a base; frame means for holding said rockets in a launching position with their rigid tail assemblies transversely spaced from each other to allow clearance for independent firing of any of the rockets; said frame means being operable to shift the rockets transversely toward each other into a transport position where said tail assemblies are transversely overlapping.

18. The device according to claim 17, wherein said frame means holds the rockets in substantially transverse alignment in said launching position; and said frame means holds said rockets transversely offset from each other in said transport position with the rigid tail assemblies axially adjacent and spaced from each other without any axial overlap.

19. A device for the storage and launching of rockets, comprising: at least two substantially parallel frame means, each for holding at least one rocket parallel with respect to a rocket held by the other; means interconnecting said frame means for movement between a launch position parallel and spaced from each other at a first distance, and a storage position parallel and spaced from each other at a second distance substantially less than said first distance; and power means for moving said frame means between said launch position and said storage position.

20. The device of claim 19, wherein said interconnecting means includes two parallel links pivotally connected between adjacent frame means to form therewith a parallelogram.

References Cited
UNITED STATES PATENTS

| | | | |
|---|---|---|---|
| 2,409,210 | 10/1946 | Jolly | 89—1.815 |
| 2,532,643 | 12/1950 | Richards et al. | 89—1.815 |
| 2,581,096 | 1/1952 | Gould | 89—1.815 |
| 3,217,900 | 11/1965 | Kupetzky et al. | 89—1.815 |

BENJAMIN A. BORCHELT, *Primary Examiner.*